(12) United States Patent
Minardo

(10) Patent No.: US 10,799,406 B2
(45) Date of Patent: Oct. 13, 2020

(54) WHEELCHAIR HANDLEBAR ADJUSTER

(71) Applicant: Michael Anthony Minardo, Winter Springs, FL (US)

(72) Inventor: Michael Anthony Minardo, Winter Springs, FL (US)

(*) Notice: Subject to any disclaimer, the term of this patent is extended or adjusted under 35 U.S.C. 154(b) by 154 days.

(21) Appl. No.: 16/048,759

(22) Filed: Jul. 30, 2018

(65) Prior Publication Data
US 2019/0038485 A1 Feb. 7, 2019

Related U.S. Application Data

(60) Provisional application No. 62/540,528, filed on Aug. 2, 2017.

(51) Int. Cl.
*A61G 5/10* (2006.01)
*B62B 5/06* (2006.01)

(52) U.S. Cl.
CPC ............... *A61G 5/10* (2013.01); *B62B 5/064* (2013.01); *B62B 5/067* (2013.01); *B62B 2202/42* (2013.01)

(58) Field of Classification Search
CPC ........................................................ A61G 5/10
See application file for complete search history.

(56) References Cited

U.S. PATENT DOCUMENTS

| | | | |
|---|---|---|---|
| 5,044,650 A * | 9/1991 | Eberle, Jr. ................ | A61G 5/10 280/304.1 |
| 5,290,055 A * | 3/1994 | Treat, Jr. .................. | A61G 5/10 16/426 |
| D390,168 S | 2/1998 | Haut | |
| D407,672 S | 4/1999 | Wells | |
| 5,915,712 A * | 6/1999 | Stephenson ............. | A61G 5/10 16/422 |
| 6,601,866 B1 * | 8/2003 | Dobies ..................... | A61G 5/10 248/68.1 |
| 6,755,430 B1 | 6/2004 | Watwood | |
| 7,500,689 B2 * | 3/2009 | Pasternak ................ | A61G 5/10 280/250.1 |
| 8,234,755 B1 * | 8/2012 | Brand ...................... | B25G 1/04 16/113.1 |
| D783,464 S * | 4/2017 | Menn ......................... | D12/133 |
| 9,931,255 B2 * | 4/2018 | Haigh ...................... | A61G 5/08 |
| 2019/0201259 A1 * | 7/2019 | Hanley ................ | A61G 5/1051 |

FOREIGN PATENT DOCUMENTS

DE 20012251 U1 7/2000
DE 202004008365 U1 12/2004

* cited by examiner

*Primary Examiner* — Kevin Hurley
(74) *Attorney, Agent, or Firm* — The Patent Guild, LLC; Paul Royal, Jr.

(57) ABSTRACT

An expandable wheelchair handlebar that adjusts in height and width.

10 Claims, 4 Drawing Sheets

WHEELCHAIR HANDLEBAR ADJUSTER

This application claims the benefit of Provisional Application 62/540,528 filed Aug. 2, 2017

BACKGROUND OF THE INVENTION

In standard use, wheelchairs are pushed along via an assistant. The task places strains on the assistant's back, legs, and arms. For example, when assisting a wheelchair bound person across a barrier or obstacle, the assistant is required to exert an increased amount of effort and a force. While the weight of the wheelchair bound person is a significant factor, the leverage provided by the handlebars of the wheelchair also greatly determines the amount of effort required by the assistant. What is needed is the ability to adjust the pushing position of the assistant as the assistant guides the wheelchair.

SUMMARY OF THE INVENTION

The present invention is an expandable wheelchair handlebar that adjusts in height and width particularly useable on new or existing wheelchairs. The adjustment would change the angle of the person pushing the wheelchair to a more upright position reducing strain on the lower back or legs. The handlebar includes bolt attachments for attaching to the wheelchair. The height and width of the handlebar is adjusted with the push of a button.

DETAILED DESCRIPTION OF THE PREFERRED EMBODIMENT

Figure 1:
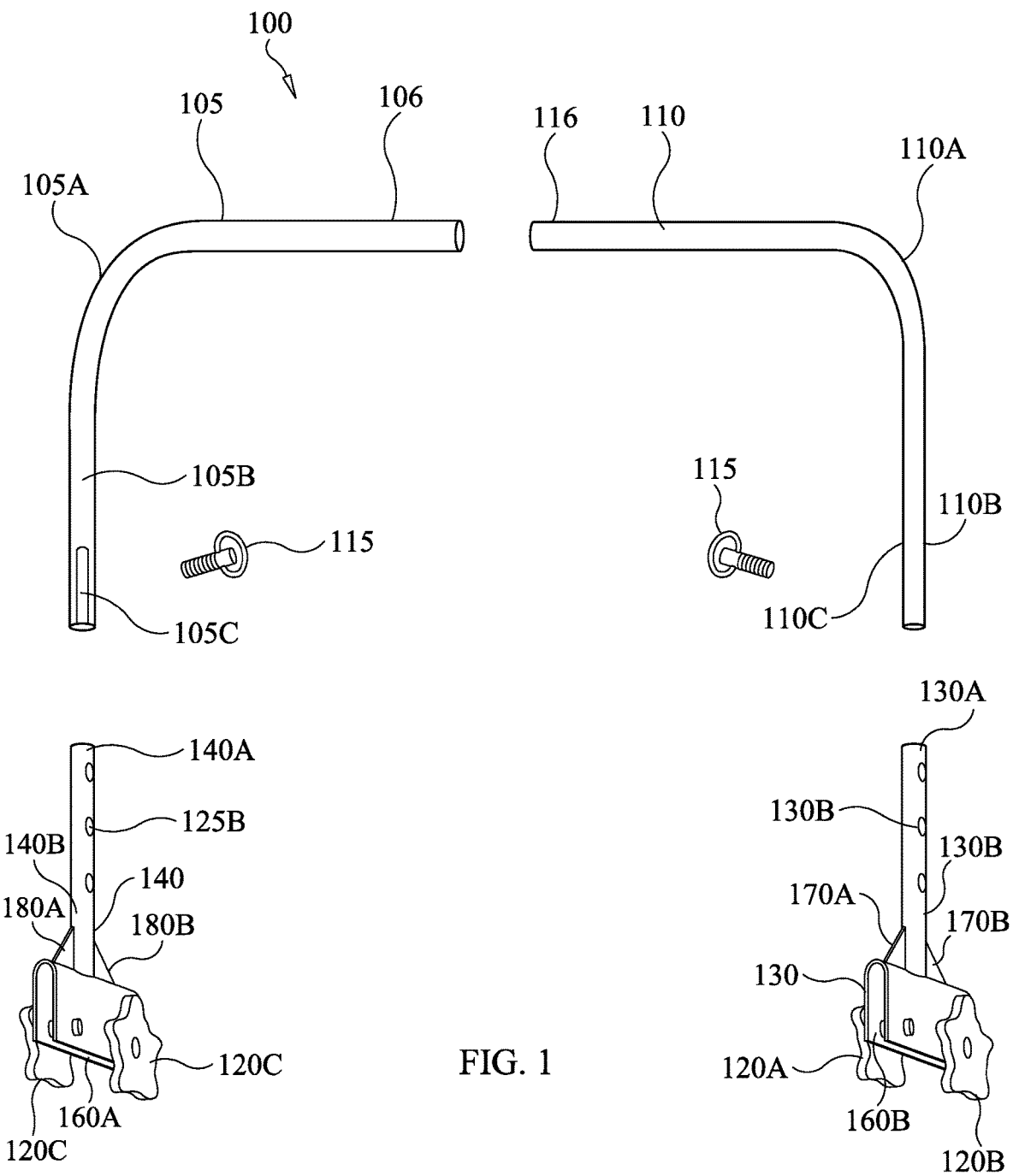
FIG. 1 shows a disassembled view of the expandable wheelchair handlebar.

The present invention, as shown in FIG. 1, is an expandable wheelchair handlebar 100 for existing wheelchair 200 that would adjust in height and width. The adjustment would change the angle of the person pushing the wheelchair 200 to a more upright position reducing strain on the lower back or legs. The handlebar includes securing bolt attachments 150 for attaching to the wheelchair 200. The height and width of the handlebar 100 is adjusted with the push of a button or removal/repositioning of a pin 115.

As shown in at least FIGS. 1-4, the expandable wheelchair handlebar 100 includes, a left handle bar 105 mating with a right handle bar 110. The left and right handlebars are symmetric with similar features as will be further disclosed.

The left handlebar 105 includes a bend 105A of approximately 90 degrees (although more or less bend may be used). At a distal end of the left handlebar 105 is mounting portion 105B which includes at least one hole 105C extending into the left handlebar distal end mounting portion 105B. At a proximal end of the left handlebar 105 is a mating portion 106.

The right handlebar 110 includes a bend 110A of approximately 90 degrees (although more or less bend may be used). At a distal end of the right handlebar 110 is mounting portion 110B which includes at least on hole 110C extending into the right handlebar distal end mounting portion 110B. At a proximal end of the right handlebar 110 is a mating portion 116.

Figure 2:
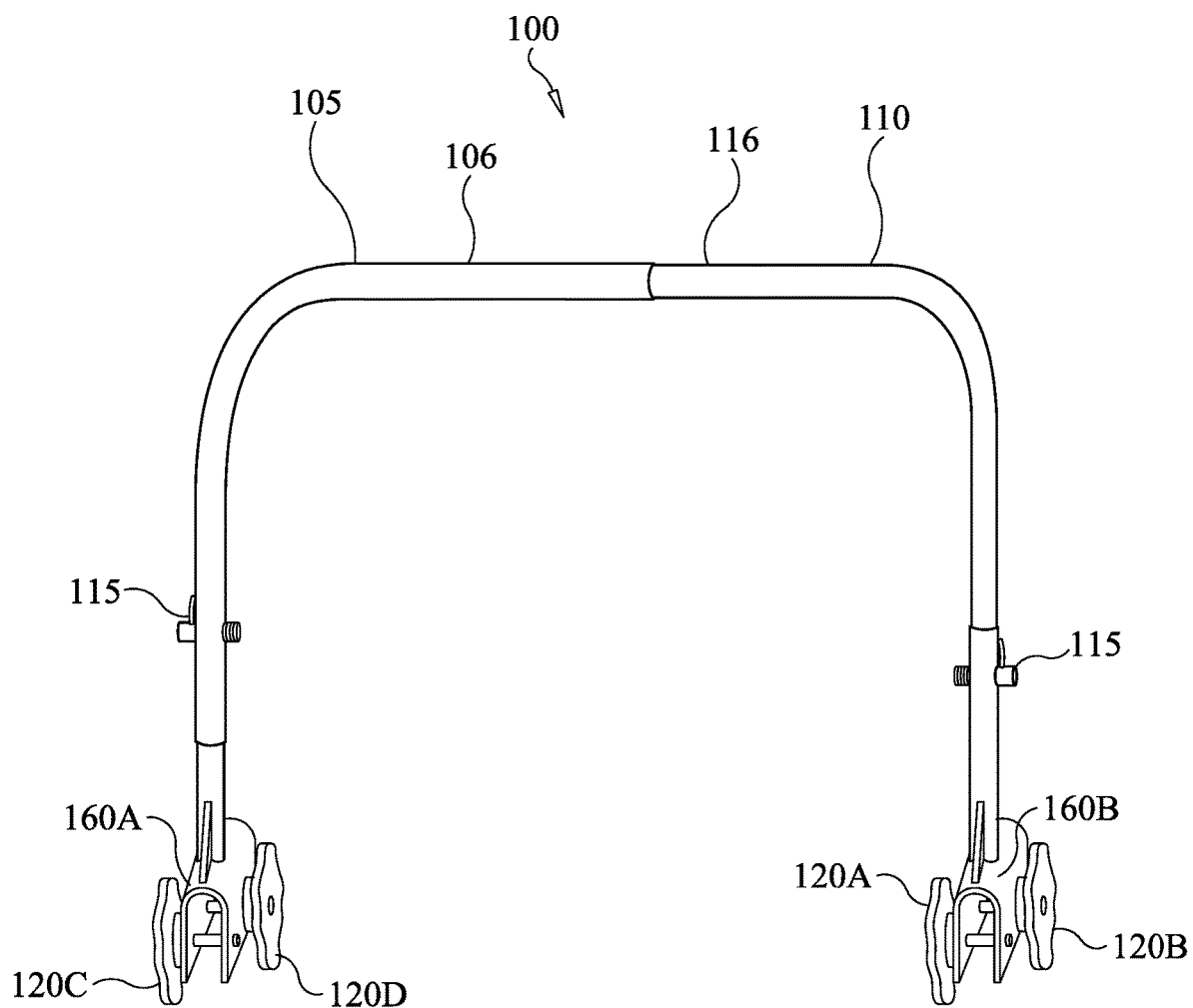
FIG. 2 shows an assembled view of the expandable wheelchair handlebar.
Figure 3:
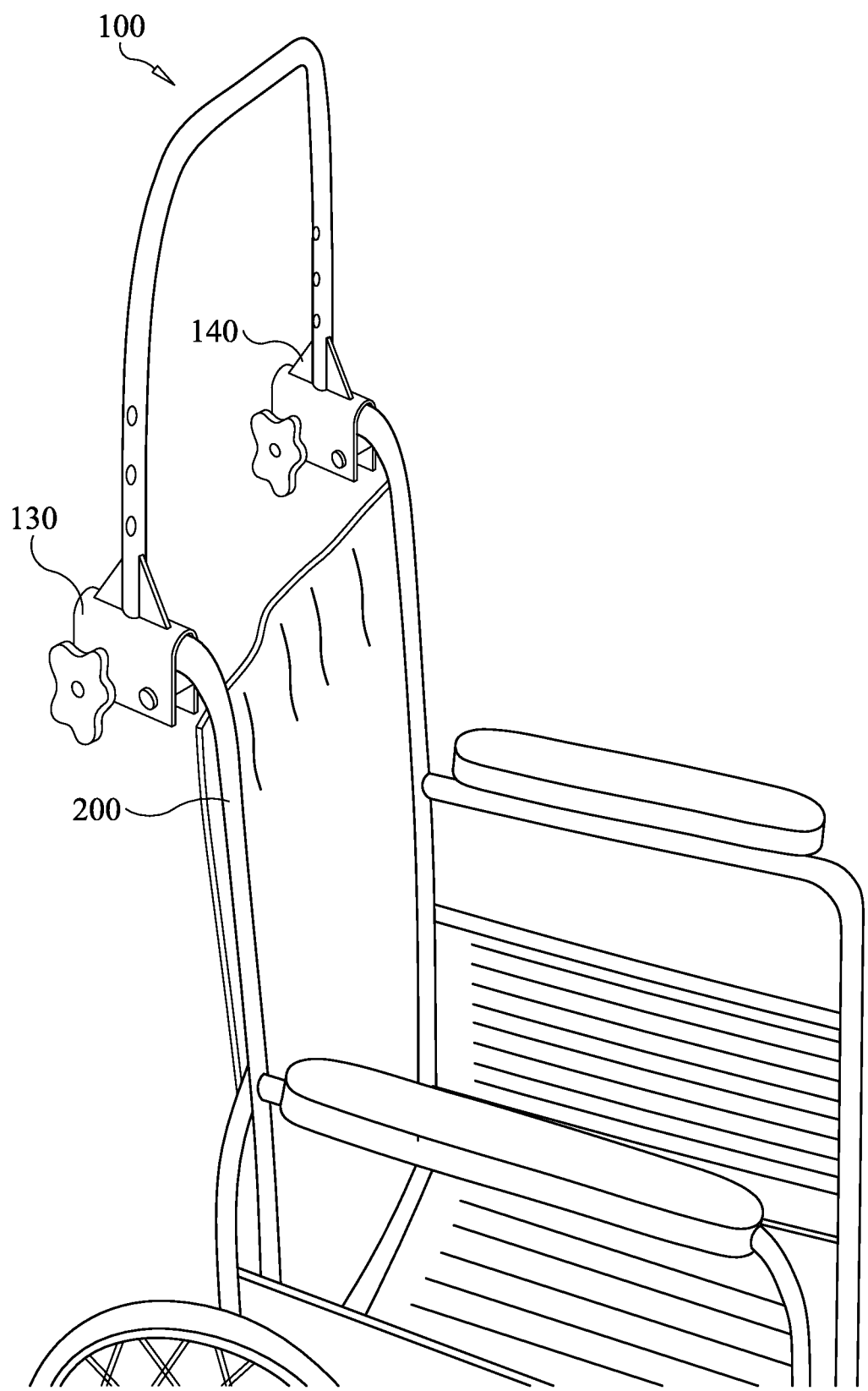
FIG. 3 shows a side view of the expandable wheelchair handlebar mounted to a wheelchair.

As shown in FIG. 2, when the left handlebar 105 and right handlebar 110 are mated, the right handlebar mating portion 116 is inserted into the left handlebar mating portion 106 or vice versa. Note the right handlebar mating portion 116 may be larger than the left handlebar mating portion 106 or vice versa.

The expandable wheelchair handlebar 100 further includes a left chair mount 140 and a right chair mount 130. A proximal end 140A of the left chair mount 140 mates with the left handlebar distal end mounting portion 105B. A proximal end 130A of the right chair mount 130 mates with the right handlebar distal end mounting portion 110B. Note the right handlebar distal end mounting portion 110B may be larger than proximal end 130A of the right chair mount 130 or vice versa. Note the left handlebar distal end mounting portion 105B may be larger than proximal end 140A of the left chair mount 140 or vice versa.

The mating of the right chair mount 130 with the right handlebar 110 is achieved with the push of a button or removal/repositioning of a pin 115. The mating of the left chair mount 140 with the left handlebar 105 is achieved with the push of a button or removal/repositioning of a pin 115.

The left chair mount 140 includes a left chair mount extension 140B which includes at least one mount hole 125B extending at least through a portion of the left chair mount extension 140B.

The right chair mount 130 includes a right chair mount extension 130B which includes at least one mount hole 125A extending at least through a portion of the right chair mount extension 130B.

When the right chair mount 130 is mated with the right handlebar 110, pin 115 is inserted through a portion of the right handlebar distal end mounting portion 110B and the right chair mount extension hole 125A.

When the left chair mount 140 is mated with the left handlebar 105, pin 115 is inserted through a portion of the left handlebar distal end mounting portion 105B and the left chair mount extension hole 125B.

A left chair mount securing channel 160A is provided on the left chair mount 140 at the distal end.

A right chair mount securing channel 160B is provided on the right chair mount 130 at the distal end.

Figure 4:
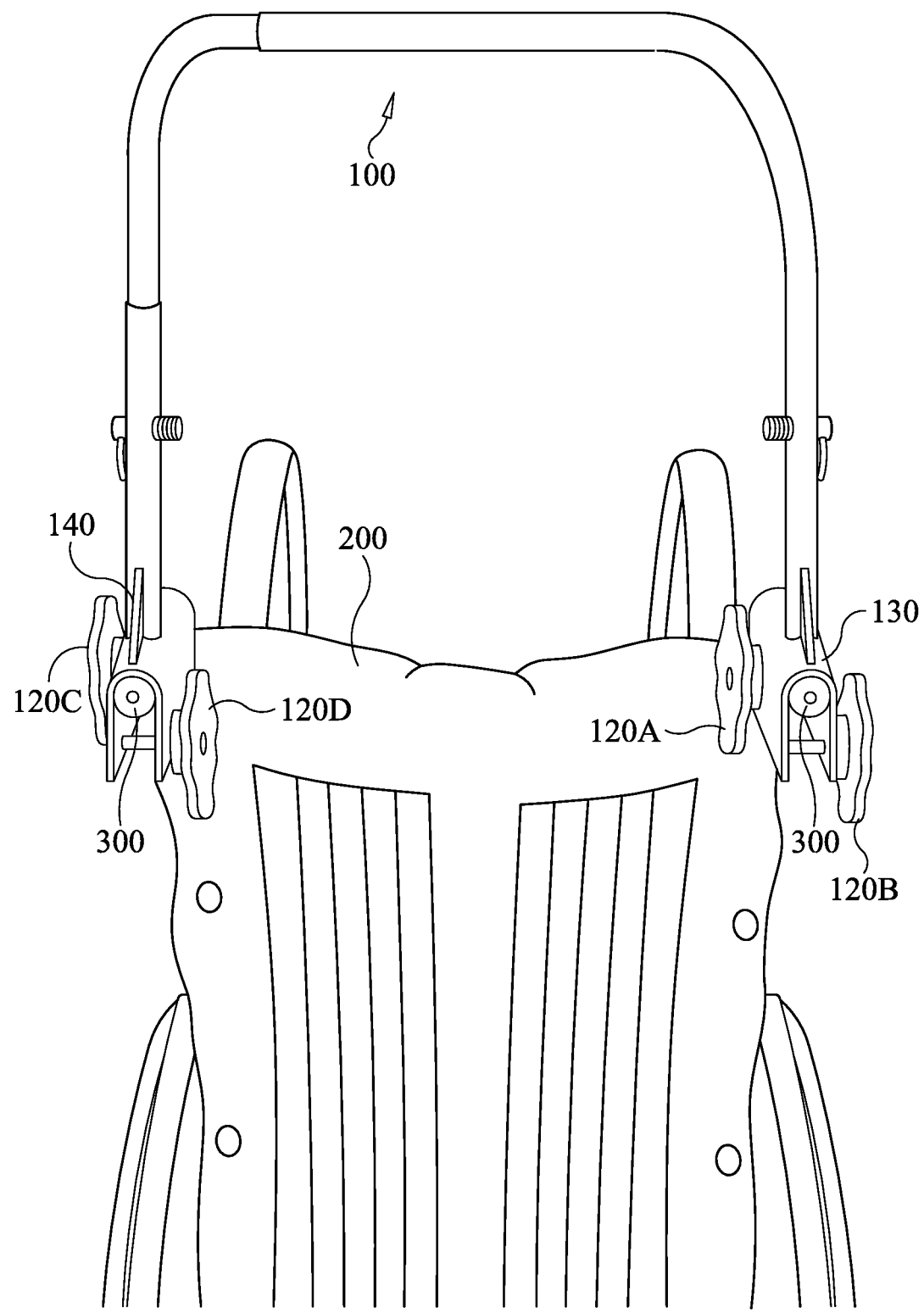
FIG. 4 shows rear view of the expandable wheelchair handlebar mounted to a wheelchair.

As shown in at least FIG. 4, each chair mount securing channel 160A and 160B has a curved interior portion fashioned to fit securingly onto wheelchair handles 300 thereby rigidly attaching the expandable wheelchair handlebar 100 to the wheelchair 200 at its handles 300.

Rigid attached is achieved by tightening clenching knobs 120A/120B provided on each chair mount 140, 130.

Specifically, a first clenching knob 120A and a second clenching knob 120B are provided on the right chair mount securing channel 160B. Optimally the clenching knobs are provided on opposing sides of the right chair mount securing channel 160B however they may also be located on the same side. A securing bolt 150 extends from each securing knob. A portion of the bolt seats in the body of the chair mount securing channel to prevent rotation of the bolt as the securing knob 120A is turned during attached or detachment of the expandable wheelchair handlebar 100.

Further, a first clenching knob 120C and a second clenching knob 120D are provided on the left chair mount securing channel 160A Securing knobs 120B, 120C, and 120D are attached, detached, and operated the same as securing knob 120A as explained above and below.

When securing knob 120A is tightened, the interior volume of the right chair mount securing channel 160B decreases, thereby tightening the grip of the right chair mount securing channel 160B on the wheelchair handle 300. Conversely, securing knob 120A is loosened, the interior volume of the right chair mount securing channel 160B increases, due to the securing channel 160B returning to its unloaded/under formed shape, thereby loosening the grip of the right chair mount securing channel 160B on the wheelchair handle 300.

Support ribs 170A and 170B are provided to help secure the right chair mount securing channel 160B to the right chair mount extension 130B.

Support ribs 180A and 180B are provided to help secure the left chair mount securing channel 160A to the left chair mount extension 140B.

A combining adapter 400 (not shown) may be used to aid in aligning or positioning the left and right handlebars (105, 110) for proper mating.

With the expandable wheelchair handlebar 100 existing wheelchairs can be upgraded to allow for the adjustment in height and width most suitable for an assistant. The adjustment would change the angle of the assistant pushing the wheelchair to a more upright position thereby reducing strain on the lower back or legs. The handlebar bolt attachments provides for attaching expandable wheelchair handlebar 100 to most known wheelchairs. The height and width of the handlebar is adjusted with the push of a button or removal/repositioning of a pin allowing for easy alignment to a comfortable height and width.

It is understood the components of the instant invention are constructed from materials suitable to the applicable usage environment. For example, the invention may be made form materials such as chrome, aluminum, steel, wood, composite materials, and other known materials.

While various embodiments of the present invention may be shown, it is understood these embodiments can be presented in various combinations or various modifications to the disclosed embodiments.

What is claimed is:

1. A wheelchair handlebar adjuster for attachment to handles of a wheelchair comprising:
   an expandable wheelchair handlebar assembly including a left handlebar and a right handlebar,
   wherein the left handlebar and the right handlebar are symmetric to each other and removably attached to the wheelchair handles,
   each of the left and right handlebar has a proximal end, a distal end, and a bend of approximately 90 degrees positioned between the ends,
   each of the left and right handlebar has a mating portion at its distal end,
   wherein the left handlebar and right handlebar are mated together at each handlebar's distal end,
   each of the left and right handlebars further includes a mounting portion at its proximal end having at least one hole;
   the handlebar assembly further includes a chair mount repositionably attached to each handlebar mounting portion by a repositioning pin provided to extend thru the chair mount and the handle bar mounting portion,
   each chair mount includes a securing channel having an interior portion fashioned to fit securely onto the wheelchair handles,
   each chair mount further includes clenching knobs positioned to assist in releasably securing the chair mount to the wheelchair handles.

2. The wheelchair handlebar adjuster of claim 1, wherein when the left handlebar and right handlebar are mated together, the mating portion of one handle bar distal end is inserted into the other handle bar's distal end.

3. The wheelchair handlebar adjuster of claim 1, wherein releasably secure attachment of the chair mount to the respective wheelchair handle is achieved by tightening or loosening the clenching knobs provided with each chair mount.

4. The wheelchair handlebar adjuster of claim 1, further including each chair mount having a chair mount extension, each with at least one hole configured to receive the repositioning pin and to attach the chair mount to the respective handlebar mounting portion.

5. The wheelchair handlebar adjuster of claim 4, wherein each chair mount extension includes a plurality of holes to provide a plurality of positions with which to adjust the distance between the chair mount and the handlebar mounting portion by selectively inserting the repositioning pin in a selected handlebar mounting position hole and in a selected chair mount extension hole.

6. The wheelchair handlebar adjuster of claim 4, further including support ribs secure each chair mount securing channel to the respective chair mount extension.

7. A wheelchair handlebar adjuster for attachment to handles of a wheelchair comprising:
   an expandable wheelchair handlebar assembly including a left handlebar and a right handlebar bar,
   wherein the left handlebar and the right handlebar are symmetric to each other and removably attached to the wheelchair handles,
   each of the left and right handlebar has a proximal end, a distal end, and a bend of approximately 90 degrees positioned between the ends,
   each of the left and right handlebars has a mating portion at its distal end,
   wherein the left handlebar and right handlebar are mated together at each handlebar's distal end,
   each of the left and right handlebars further includes a mounting portion at its proximal end having at least one hole;
   the handlebar assembly further includes a chair mount repositionably attached to each handle bar mounting portion by a repositioning pin,
   each chair mount includes a chair mount extension having at least one mount hole extending at least through a portion of the chair mount extension,
   wherein each chair mount is repositionably attached to each handle bar mounting portion by inserting each repositioning pin through handle bar mounting portion and chair mount extension;
   each chair mount includes a securing channel having an interior portion fashioned to fit securely onto the wheelchair handles,
   each chair mount further includes knobs to assist in securing the chair mount to the wheelchair handles.

8. The wheelchair handlebar adjuster of claim 7 wherein each handlebar mounting portion includes at least one mounting portion hole sized to receive the repositioning pin.

9. The wheelchair handlebar adjuster of claim 7, wherein the chair mount extension includes a plurality of holes to provide a plurality of positions it adjust the distance between the chair mount and the handle bar mounting portion by selectively inserting the the repositioning pin in a selected handle bar mounting position hole and a selected chair mount extension hole.

10. A wheelchair handlebar adjuster for attachment to handles of a wheelchair comprising:
   an expandable wheelchair handlebar assembly including a left handlebar and a right handlebar,
   wherein the left handlebar and the right handlebar are symmetric to each other and removably attached to the wheelchair handles,
   each of the left and right handlebar has a proximal end, a distal end, and a bend of approximately 90 degrees positioned between the ends,
   each of the left and right handlebar has a mating portion at its distal end,
   wherein the left handlebar and right handlebar are mated together at each handlebar's distal end,
   each of the left and right handlebars further includes a mounting portion at its proximal end having at least one hole;
   the handlebar assembly further includes a chair mount repositionably attached to each handlebar mounting portion by a repositioning pin provided to extend thru the chair mount and the handle bar mounting portion,
   each chair mount includes a securing channel having an interior portion fashioned to fit securely onto the wheelchair handles,
   each chair mount further includes clenching knobs positioned to assist in releasably securing the chair mount to the wheelchair handles,
   wherein when the left handlebar and right handlebar are mated together, the mating portion of one handle bar distal end is inserted into the other handle bar's distal end,
   wherein releasably secure attachment of the chair mount to the respective wheelchair handle is achieved by tightening or loosening the clenching knobs provided with each chair mount,
   further including each chair mount having a chair mount extension, each with at least one hole configured to receive the repositioning pin and to attach the chair mount to the respective handlebar mounting portion,
   wherein each chair mount extension includes a plurality of holes to provide a plurality of positions with which to adjust the distance between the chair mount and the handlebar mounting portion by selectively inserting the repositioning pin in a selected handlebar mounting position hole and in a selected chair mount extension hole,
   wherein support ribs secure each chair mount securing channel to the respective chair mount extension.

* * * * *